March 31, 1970 K. GOSER 3,504,354

WORD-ORGANIZED SUPERCONDUCTIVE LAYER STORE

Filed July 12, 1967

INVENTOR.

Karl Goser

BY Stiel & Lie ATTORNEYS

United States Patent Office 3,504,354
Patented Mar. 31, 1970

3,504,354

WORD-ORGANIZED SUPERCONDUCTIVE LAYER STORE

Karl Goser, Munich, Germany, assignor to Siemens Aktiengesellschaft, a corporation of Germany
Filed July 12, 1967, Ser. No. 652,888
Claims priority, application Germany, July 14, 1966, S 104,784
Int. Cl. G11b 9/02
U.S. Cl. 340—173.1 5 Claims

ABSTRACT OF THE DISCLOSURE

A word-organized superconductive continuous film store, in which the information is stored as a persistent current at the crossing point of two drive lines (digit and word lines) which are respectively disposed at opposite sides of a superconductive storage layer in the form of a continuous film, in which the thickness of the storage layer has a magnitude, with respect to the penetration depth of the fields of the driving currents, that they coact over the screening currents, and which permits the utilization of a simple geometrical configuration with only two lines.

The invention relates to a superconductive memory matrix in which the induction current, which is produced at the crossing point of two energized lines in an interdependent superconductive layer, exceeds their critical current and thus, when the currents are switched off, results in a localized superconductive persistent current (the magnetic field of which is the so-called latent flux), whose magnitude and/or sense of direction represents the data to be stored.

The fundamental design of all stores involving this principle which heretofore have been proposed has embodied a superconductive storage layer vaporized on a base, at one side of which, disposed one below the other and insulated with respect to the layer, are two groups of conductors which are mounted in crossing relation (e.g. two groups of parallel strips crossing each other, one below the other), with sensing means being provided on the other side of the layer.

Prior stores embodying such superconductive layer storage cells (a crossing point of two lines corresponding to one cell). in which the cells are coincidentally controlled, have invariably failed, apart from technological difficulties in production, due to the fact that half-pulses (where only one line of a cell is carrying current) having the opposite polarity, such as drive pulses, cause a diminishing of the stored magnetic flux and consequently little by little destroy the information. Likewise it has been found that the fields, when written in by means of the second drive line (induction currents), are distorted which leads to non-uniform large storage currents and, as a result, to a narrowing of the working range of the cells.

These difficulties are avoided, according to the invention, by a word-organized superconductive layer store, in which both groups of drive lines, the word lines and the digit lines, are arranged on different sides of the storage layer, and wherein the number of lines can be reduced to only such two, which being on opposite sides of the memory plane, are mutually shielded thereby.

Further details of the invention will be evident from the following description of the mode of operation, as well as from the explanation of the embodiments illustrated in the drawings, wherein like reference characters indicate like or corresponding parts, and in which.

The common feature of the illustrater embodiments of the invention is that the digit lines 3, which may be constructed as parallel superconductive strips, separated from storage layer 1 by an insulating layer (not shown), serve at the same time as sense lines. This measure, which heretofore has not been possible in the conventional types of stores in which both drive lines are disposed at the same side of the storage layer, represents a considerable technological simplification. Not only are two evaporating processes (insulating layer and additional sense line) eliminated, but also the extremely complicated and trouble-causing adjustment of the necessary grid mask for insuring that the sense lines run precisely over the cells (crossing points of the drive lines).

Figures 1, 2, 3:
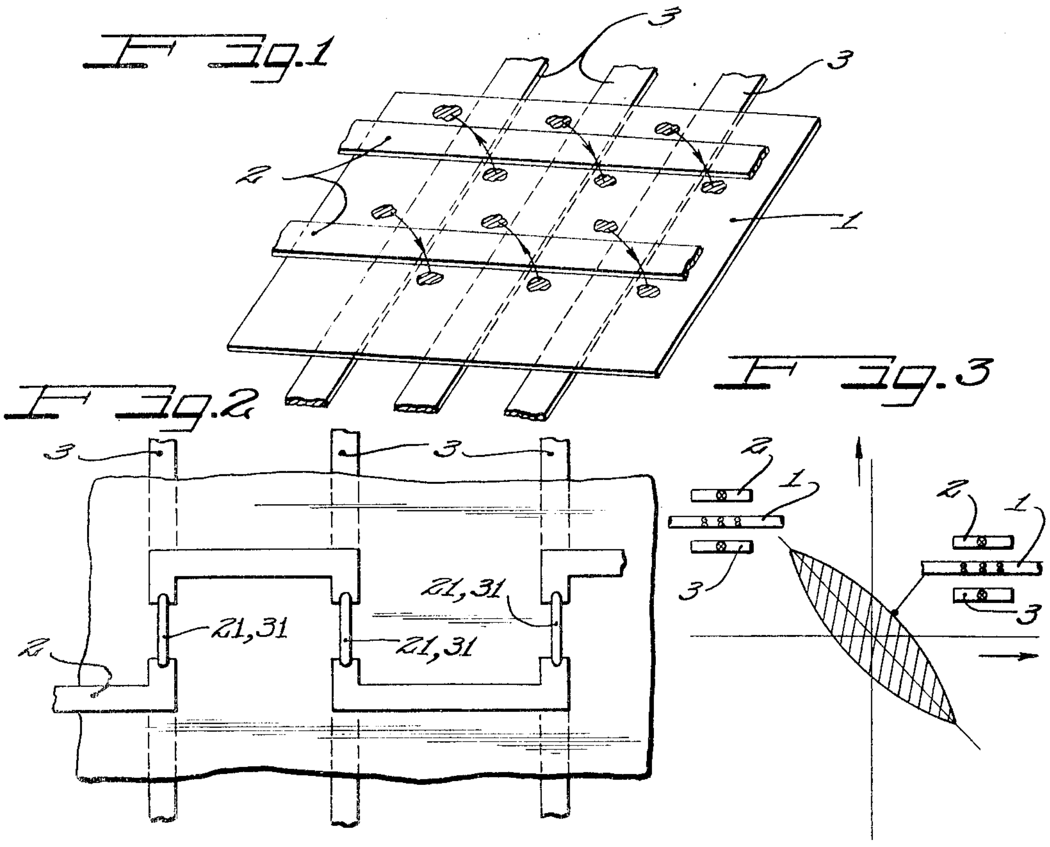
FIG. 1 is a perspective view of a portion of a continuous film memory, illustrating a plurality of cells thereof.
FIG. 2 is a plan view of a plurality of cells, illustrating a particularly favorable embodiment.
FIG. 3 is a diagram illustrating the phase transition limits of the memory plane, as a function of the word and bit current, in the embodiment illustrated in FIG. 2.

FIG. 1 illustrates a portion of such a matrix arrangement, in which the word lines 2, extend at right angles to the digit or bit lines 3. On one of the two sides of the superconductive storage layer 1, which, for example, consists of tin and has a thickness of from 600–1500 A., preferably 900–1100 A., strips forming digit lines, for example of lead and extending parallel to each other, are evaporated, which are 25–200 $\mu$m. wide and appro. 3000–4000 A. thick and are separated from the storage layer 1 by an insulating layer, for example of SiO, with a thickness of approx. 3000 A., (not shown). The word lines 2 are evaporated on the other side of the storage layer 1, likewise separated therefrom by an insulating layer, such strips likewise being of lead, with dimensions corresponding to those of the bit lines 3 and of a meandering configuration.

If positive current pulses simultaneously occur on the word line and on the bit line of a cell of such arrangement, a magnetic flux is written into the cell and the information "1" is thereby stored. The thickness of the storage layer 1 must be of a magnitude which includes the penetration depths of the magnetic fields of the driving currents so that the screening currents created in the layer 1 through the magnetic fields on both sides thereof (due to the ideal diamagnetism of superconductors) coact. In order to read the information "1," the magnetic flux is written in the opposite direction through a negative pulse $J_a$ on the word line 2 which appropriately shows a greater amplitude than the writing-in impulse $J_e$ ($J_e < J_a < 2J_e$). Since the magnetic flux is thereby changed, an induced voltage signal occurs at the end of the bit line which thus simultaneously serves as a sense line. This action also places the cell in a state representing the information "0." In the entry of the desired information, "0" or "1," the cell to designate a "1," is switched by the simultaneous pulsing of both the word line and the pertinent bit line, while the bit lines of the cells to designate a "0" are not pulsed. The word lines 2 extending parallel to each other and lying at right angles to the bit lines 3 need not be adjusted with respect to the bit lines. In this arrangement the current ration has a value of $\sqrt{2}:1$. The crossing angle of 90°, however, is not absolutely necessary, and in order to increase the current tolerances a sharp angle $\gamma$ can be employed, the tolerance thereby increasing to the value of $$2 \cos \frac{\gamma}{2}:1$$

FIG. 2 illustrates a portion of a modified storage matrix arrangement, in which the word lines 2, while extending across the matrix at substantially right angles to the bit line 3, are of a meandering or serpentine configuration, the word and bit lines having respective portions 21, 31, (only the portion 21 being visible in FIG. 2) disposed in superimposition, as viewed in FIG. 2, at opposite sides of the storage layer 1. The dimensions (layer thickness, strip widths, etc.) generally correspond to those mentioned with respect to the structure of FIG. 1. In order to insure a precise adjustment of the superimposition of two drive-line systems, parts 21 of the word lines and parts 31 of the bit lines are evaporated through one and the same mask. The entire layer sequence is disposed on an electrically insulating, good heat-conducting substratum (e.g. glass or ceramic) and is provided on the other side with an insulating layer and a protective layer. While the word and bit lines can be exchanged in their geometry, the bit line should always function as a sense line as hereinafter discussed.

This arrangement basically operates in the same manner as described in connection with FIG. 1. However, it will be noted that as the word line has a serpentine shape, to insure the application of positive pulses to each intersection, the positive direction will alternate in the bit lines so that the current flow in the cooperable portions 21, 31 of the respective intersection will be in proper relation.

This arrangement exhibits a very great current tolerance, the current ratio of fully controlled cells to halfpulses being 2:1, due to the parallelism of the currents over the cells.

The operation of a memory constructed in accordance with the invention may be explained in connection with FIGS. 3 and 4, which refer to a store constructed in accordance with the disclosure of FIG. 2.

Figure 4:
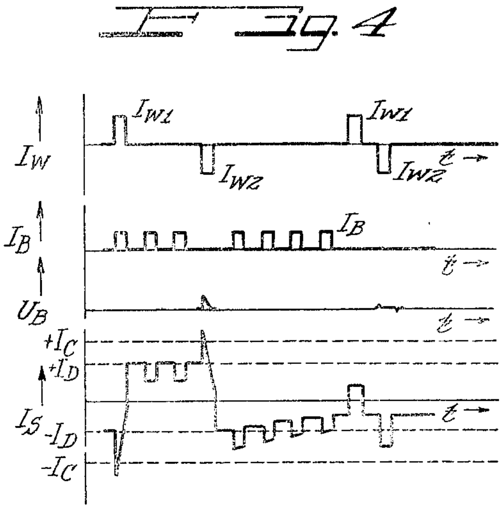
FIG. 4 is a chart illustrating pulse and current courses involved in the operation of the embodiment illustrated in FIG. 2.

Persistent currents can be stored in the storage layer 1 at each intersection, the induced stored current $I_S$ in the storage layer 1 is shown in FIG. 4, together with the pulse trains driving the cell. It will be apparent that after simultaneously pulsing with $I_{W1}$ and $I_B$ on the pertinent word and bit lines a persistent current $+I_D$ is stored. In reading the information the cell is switched by the pulse $I_{W2}$ passing over the word line, with the resultant flux switching giving rise to a voltage pulse $U_B$ on the sense line (bit line) and a reversed current $-I_P$ is stored in the layer.

FIG. 3 shows the phase transition limits of the storage layer as a function of the word and bit current. Only within the shade region is the storage layer between the lines superconducting. A qualitative understanding of the diagram of FIG. 3 will result from a consideration of the screening or image currents in the storage layer. If the layer thickness is almost equal to the penetration depth the phase transition is induced by the resultant current of the two image currents flowing on both sides of the layer. The phase transition therefore occurs at low uni-direction currents (point A) and at high inverse currents (point B). At point A the characteristic represents approximately a line extending at an angle of 45°. Consequently, the two image currents superpose nearly completely in the thin superconductive layer.

The storage current $+I_X$ ($-I_D$) in layer 1 coupled with the "latent flux" is always opposite in direction to the driving current that produces it. Since a change of the stored flux is only possible if the total field, resulting from it and from the driving current field, exceeds the critical field strength of the layer, and an addition of these fields occurs only for currents on the driving lines having opposite polarity with respect to the original writing-in current (positive pulses), (the bit lines always conducting only positive pulses), the magnetic flux, which represents a "1," cannot deteriorate as a result of halfpulses on the lines (the word lines never conduct halfpulses). While the flux stored after the selection of a "0" can deteriorate as a result of such pulses, the operation of the store is not impaired thereby, since no sensing signal is supposed to occur when a "0" is selected. Furthermore, the influence of the halfpulses on the flux, which signifies a "0," is in any case smaller in this type of control than in the bit-organized store, because only positive halfpulses are involved and not halfpulses of varying polarity.

The advantages in comparison with a word-organized store constructed with cryotrons are as follows:

(1) Simpler construction.

(2) Smaller space requirements.

(3) The method is more dependable, as the magnetic flux is stored in a homogenous layer.

Compared with known forms of superconductive layer stores (bit-organized), the invention has the following advantages:

(1) Only two instead of three lines are required.

(2) The fields are not distorted by the other driving line when they are written in.

Figure 5:
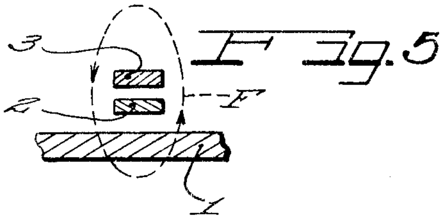
FIGS. 5 and 6 respectively illustrate sections through a portion of a known type of store and a corresponding portion of a store such as illustrated in FIG. 2.
Figure 6:
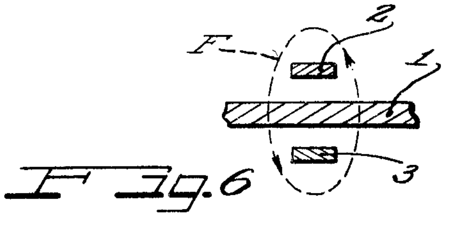

(3) The stored flux F in a cell is more efficiently retained, which becomes evident by comparing the schematic field-strength distribution in a cell of a conventional layer storer, in which the drive lines are arranged on the same side of the storage layer (FIG. 5) and a cell arranged in accordance with the invention (FIG. 6). In the latter case, the flux cannot be withdrawn from the layer when the normally conductive areas existing therein threaten to disappear for any reason, since it is held back by the bit line which it cannot penetrate because of the latter's superconductivity.

It will be apparent that many modifications and variations may be effected without departing from the present invention.

I claim:

1. In a word-organized superconductive layer store in which the information is stored as a superconductive permanent current at the crossing points of two drive lines (bit and word lines respectively) in an interdependent superconductive layer electrically insulated from the drive lines, the combination of the word lines extending along one of the two sides of the superconductive storage layer and the bit lines extending along the other side of the layer, the superconductive storage layer having a thickness which is in the magnitude of the depth of penetration of the fields of the drive currents, so that they affect each other over the shielding currents.

2. A word-organized superconductive layer store according to claim 1, wherein the bit lines are constructed as straight strips extending parallel to each other and also function as sense lines.

3. A word-organized superconductive layer store according to claim 2, wherein the word lines extend substantially at right angles to the bit lines and are constructed with a serpentine configuration having portions extending parallel to the opposite the bit lines.

4. A word-organized superconductive layer store according to claim 2, wherein the word lines are straight, parallel strips extends at right angles to the bit lines.

5. A word-organized superconductive layer store according to claim 1 wherein the bit lines and/or word lines consist of superconductors having higher values of the critical field strengths than the superconductors constituting the storage layer (1).

References Cited

UNITED STATES PATENTS

| | | | |
|---|---|---|---|
| 3,047,744 | 7/1962 | Pankove | 340—173.1 |
| 3,302,188 | 1/1967 | Miller | 340—173.1 |

TERRELL W. FEARS, Primary Examiner

U.S. Cl. X.R.

307—238